(No Model.) 2 Sheets—Sheet 1.

D. BEARLY.
LAWN MOWER.

No. 314,988. Patented Apr. 7, 1885.

Witnesses:
Elias Phelps
L. D. Bundy

Inventor:
David Bearly, By
Thos. B. Redding.
His Attorney in fact.

(No Model.) 2 Sheets—Sheet 2.

D. BEARLY.
LAWN MOWER.

No. 314,988. Patented Apr. 7, 1885.

Witnesses:
Elias Phelps
L. D. Bundy

Inventor:
David Bearly, by
Thos. B. Redding,
His attorney in fact.

UNITED STATES PATENT OFFICE.

DAVID BEARLY, OF NEW CASTLE, INDIANA.

LAWN-MOWER.

SPECIFICATION forming part of Letters Patent No. 314,988, dated April 7, 1885.

Application filed February 5, 1884. (No model.)

*To all whom it may concern:*

Be it known that I, DAVID BEARLY, a citizen of the United States, residing at New Castle, in the county of Henry and State of Indiana, have invented a new and useful Improvement in Lawn-Mowers, of which the following is a specification.

My invention relates to and has for its object to provide a light, easily-operated, and rapidly-cutting machine, and one that will cut grass of any height.

My invention consists in the devices and combinations of devices hereinafter described, and particularly pointed out in the claims.

Figure 1:
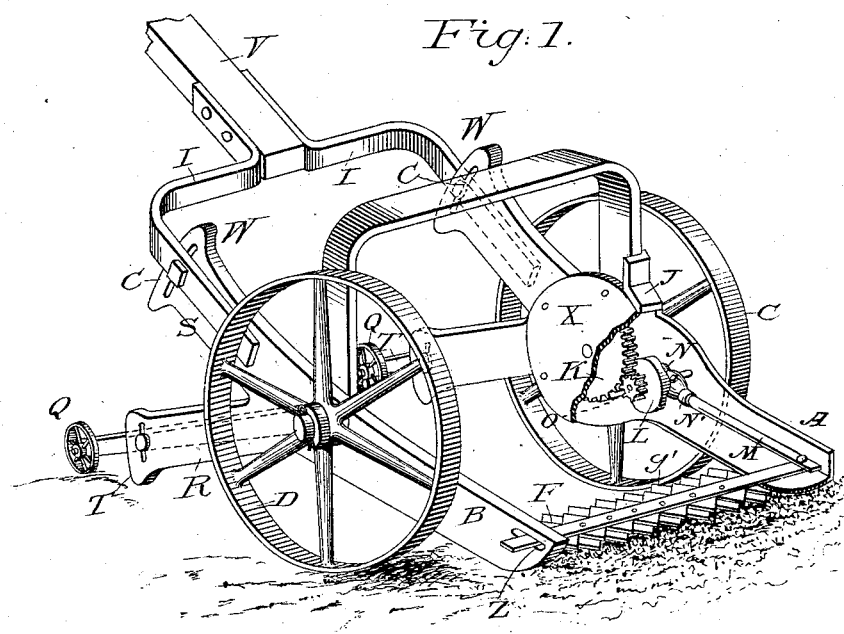
Figure 2:
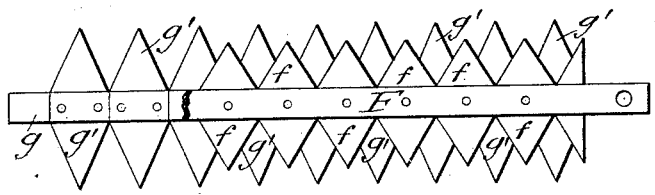
Figure 3:
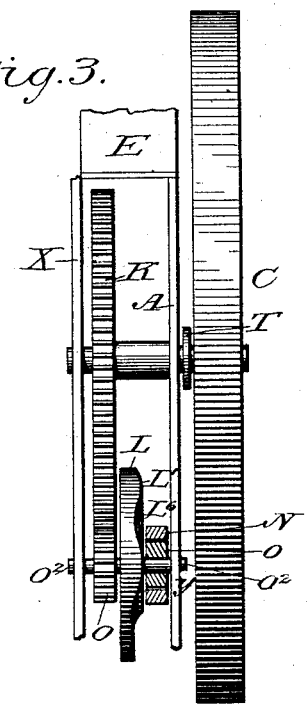
Figure 4:
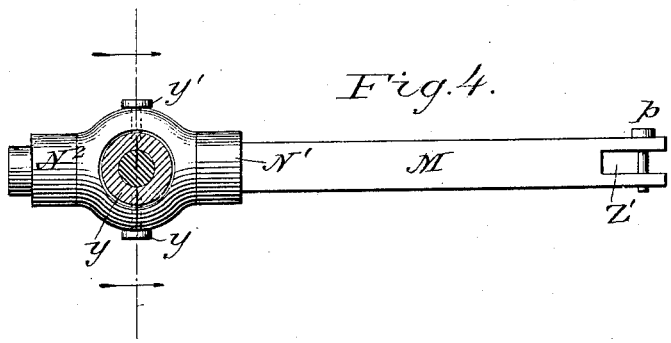
Figure 5:
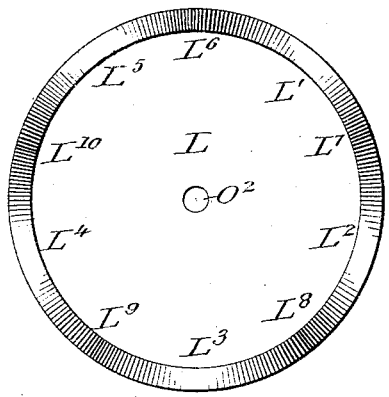

In the accompanying drawings, forming part of this specification, Figure 1 is a perspective view of the machine. Fig. 2 is a plan view of the cutters. Fig. 3 is a front elevation of the operating mechanism. Fig. 4 is a side elevation of the lever which operates the cutter-bar. Fig. 5 is a side elevation of the wave-wheel.

Similar letters refer to similar parts in all the figures.

C D are the main supporting-wheels, carried on short independent axles; A B, the side bars or plates of the main frame. They are connected and braced by the yoke or arch-brace E, secured to them near their centers, and by the fixed cutter-bar G, secured at their forward lower ends. This yoke also serves as a brace. To the cutter-bar G are removably secured by means of bolts the double-pointed knives or cutters $g'$, which, when dulled by use, may be reversed—that is to say, the other points brought forward into an operative position. Above these cutters is placed the reciprocating cutter-bar F, which works through a slot, Z, in the side bar, B. To this cutter-bar are permanently secured the double-pointed cutters $f$, which are a little shorter than the cutters $g'$, in contact and in conjunction with which they operate. These cutters $f$ are reversed by detaching the bar F from the vibrating lever, hereinafter described, withdrawing the said bar from the slot Z and turning it end for end.

K is a gear-wheel secured to the axle, which is fixed to and turns with the wheel C, said axle having bearings in the side plate, A, and the plate X, which is bolted to a rim or flange projecting from the plate A, and with said plate forms a shield for the gearing.

O is a pinion fixed on the shaft $O^2$, having its bearing in side plates, A and X, which pinion meshes with and is driven by the gear-wheel K. Fixed to this pinion and the shaft $O^2$ is the wheel L, having at its periphery a flange projecting outward at right angles to its face. This flange has its outer edge formed into a series of cams or waves so arranged that the summit of each wave is diametrically opposite a depression between two waves.

$y$ is a sleeve or hollow boss secured to the inner side of the plate A, and surrounding the shaft $O^2$.

M is a lever having an enlarged portion, N, through which is a circular opening, which is passed loosely over the sleeve $y$. $y'$ are pivot-bolts passing vertically through this part of the lever M and into the sleeve $y$, which bolts form the fulcrum of said lever. On opposite sides of this fulcrum the lever is provided with studs or friction-rollers $N'$ $N^2$, which are engaged by the cams on the wheel L. By this means a rapid vibration is given to the lever M. This lever projects forward parallel to the side plate A, and its forward end is slotted at $Z'$. The end of the reciprocating cutter-bar F is inserted in this slot, and is pivoted to said lever by a pivot, $p$, and the reciprocating movement is thereby communicated to said cutter-bar.

The machine is pushed forward by the handle V. To the forward end of this handle are bolted the braces I, which are pivoted at their forward ends to the rear projections, S, of side plates, A B. The frame is adjusted up and down, swinging upon the main axles.

To vary the height of the cutting apparatus above the ground, I use the following means: In the rear extensions, S, of the side bars, and in rear of the pivots of the braces, I, are found the curved slots $c$. Through these slots and through the braces pass the bolts W, and the parts are clamped together in their adjusted position by thumb-nuts engaging screw-threads upon the ends of said bolts.

J is the flange or rim of the plate A, which passes over the gearing, and to which the plate X is secured. The front portion of this rim is removable, so that access may be had to the gearing.

T T are arms pivoted on the main axle, and projecting to the rear. On the rear ends of these arms are pivoted the small supporting-wheels Q. These wheels are adjusted up and down by means of bolts passing through the arms T and through slots in the ends of the rearward-extending arms R of the side plates, thumb-screws on the ends of the bolts clamping the parts together.

I am aware that cutters and cutter-bars, cam-wheels, and other devices used in my machine have been used in other and different combinations, and I do not claim them, broadly and separately; but What I do claim as my invention, and desire to secure by Letters Patent, is—

1. In a lawn-mower, the combination of a drive-wheel, C, supporting-wheel D, the axles of said wheels, side bars, A B, having the rear projecting arms, R S, provided with the curved slots, connecting-yoke E, adjustable arms T', adjustable handle-braces I, fixed cutter-bar g, provided with reversible knives g', reversible reciprocating cutter-bar F, gear-wheel K on the axle of the drive-wheel shaft $O^2$, pinion O, and cam-wheel L, fixed to said shaft, the boss y on the side plate A, lever M, provided with aperture N, passing over said boss and pivoted to the boss, and also provided with friction-rollers $N'$ $N^2$, adapted to engage the cams on said wheel L, and with a slot at its forward end for receiving the cutter-bar F, to which it is pivoted, the shield X, and the removable rim of the plate A, substantially as and for the purposes set forth.

2. The combination of the wheel D, drive-wheel C, side plate A, provided with the boss y, and the rim J, having a removable portion, the covering-plate X, the side plate B, having the slot Z for the reciprocating cutter-bar, the fixed cutter-bar g, having reversible knives, the reversible reciprocating cutter-bar F, the gear-wheel K, the shaft $O^2$, the pinion O, and cam or wave wheel L, secured to said shaft, the lever M, provided at its forward end with a horizontal slot and a pivot for engaging the reciprocating cutter-bar, and having the opening N, adapted to pass over the boss y, the pivots y', connecting said lever to said boss, and the friction-rollers $N'$ $N^2$, attached to said lever and engaging the cams or waves on the wheel L, substantially as and for the purposes set forth.

DAVID BEARLY.

Witnesses:
WM. MUHOUSE,
ALONZO STOFER.